United States Patent [19]
Massar

[11] 4,015,168
[45] Mar. 29, 1977

[54] CURRENT LIMITING DEVICE FOR AN ELECTRICAL NETWORK

[75] Inventor: Ernst Massar, Erlangen, Germany

[73] Assignee: Siemens Aktiengesellschaft, Munich, Germany

[22] Filed: July 30, 1975

[21] Appl. No.: 600,372

[30] Foreign Application Priority Data
July 31, 1974 Germany .......................... 2436929

[52] U.S. Cl. .......................... 361/19; 323/9
[51] Int. Cl.² .......................... H02H 3/00
[58] Field of Search ............ 317/13 D, 16, 20; 307/245, 306; 335/301; 323/9, 44 F; 336/DIG. 1

[56] References Cited
UNITED STATES PATENTS

| | | | |
|---|---|---|---|
| 3,384,762 | 5/1968 | Mawardi | 307/245 |
| 3,458,764 | 7/1969 | Gertsch et al. | 317/20 UX |
| 3,691,491 | 9/1972 | Massar et al. | 317/13 D X |
| 3,703,664 | 11/1972 | Cronin | 317/20 |

*Primary Examiner*—Harry Moose
*Attorney, Agent, or Firm*—Kenyon & Kenyon Reilly Carr & Chapin

[57] ABSTRACT

A current limiting device for a network which comprises a magnetically shielded superconductor coupled to the network with the shielding means having controllable magnetizing coils by which they can be transversely magnetized up to saturation.

8 Claims, 5 Drawing Figures

CURRENT LIMITING DEVICE FOR AN ELECTRICAL NETWORK

BACKGROUND OF THE INVENTION

This invention relates to current limiting devices for use in electrical networks in general and more particularly to an improved current limiting device utilizing a superconductor coupled to the network.

The use of superconductors as current-limiting devices in electrical networks is known. Such use of a superconductor depends upon its property of switching over from a superconducting state into a normally conducting state when subjected to a magnetic field above that which it can tolerate and remain superconducting. One type of device is disclosed in U.S. Pat. No. 3,691,491. In this known device, the superconductor is coupled directly into the network to be protected and is designed so that at a desired overcurrent a magnetic field will exist which will cause the superconductor to go into a normally conducting state. This occurs due to the superconductor's own magnetic field. Although such devices operate quite well, they have a serious disadvantage in that each device must be designed for a particular current. Thus, for each different application a separate superconductor must be designed. It is impossible to make a single superconductor adjustable so that it can trip at any one of a plurality of desireable currents.

In view of this, the need for an improved device of this nature which permits adjusting of the tripping of the superconductor into a normally conducting state at any desired current becomes evident.

SUMMARY OF THE INVENTION

The present invention provides such a current limiting device utilizing a superconductor. In accordance with the present invention, a current limiting device which can be operated for any desired current is obtained by magnetically shielding the superconductor, with a magnetically permeable shielding means, from the magnetic field which is produced by a winding through which the network current flows and by providing in conjunction with the shielding controllable magnetizing coils which are arranged to transversely magnetize the shielding means up to saturation. What is meant by transversely herein is magnetization in a direction perpendicular to that which is caused by the winding through which the network current flows.

More specifically, in accordance with one illustrated embodiment, an air core transformer is the winding from which the superconducting coil is shielded. The primary winding of the air core transformer is placed in series with the network to be protected and the secondary winding connected in series with the superconductor. Through the use of such a transformer it becomes possible to match the voltage of the secondary winding of the air core transformer to the properties of the superconductor in an optimum manner. Furthermore, the superconductor can be designed for small voltage avoiding insulation problems. An additional advantage of this arrangement is that the superconductor is protected against incident traveling waves having a steep rising edge by the air core transformer. This eliminates extreme stresses and results in a considerably simpler structural design of the superconductor.

In accordance with another feature of the present invention means, particularly a fast-acting circuit breaker, are provided to disconnect the superconductor from the secondary winding a short time after an overcurrent occurs. By doing so, the evaporation of the coolant surrounding the superconductor is limited to a great extent.

In accordance with one embodiment, the superconductor is arranged coaxially with concentrically nested primary and secondary windings of the air core transformer. In this arrangement, the superconductor is surrounded by a closed iron shield. In another disclosed embodiment the superconductor is disposed between axially subdivided windings of the air core transformer. In this embodiment it is only necessary that magnetically conducting sheets be provided at both end faces of the superconductor with the conducting sheets extending over the full width thereof. In addition, between the superconducting sheets at each end face magnetically conducting deflection sheets running in a direction parallel to the superconductor axes are disposed.

DETAILED DESCRIPTION OF PREFERRED EMBODIMENT

Figure 1:
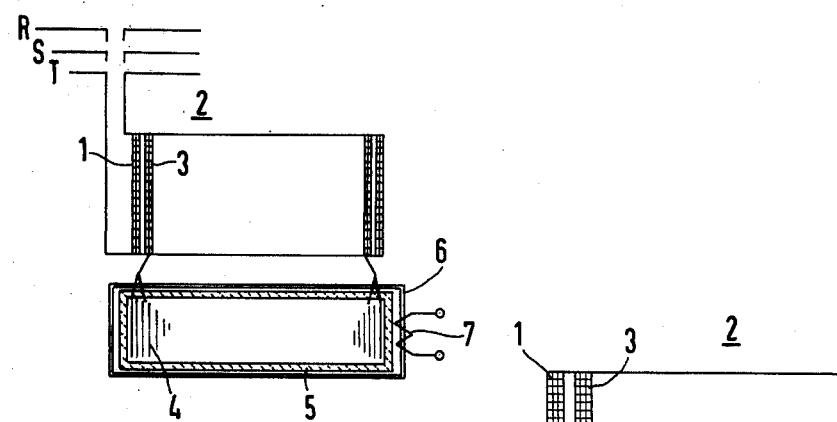
FIG. 1 schematically illustrates a first embodiment of the present invention in which the superconductor is arranged coaxially with an air core transformer.

FIG. 1 illustrates a first embodiment of the present invention. Shown are the three phases R, S and T of an AC three phase network. Each of the phases will, of course, be separately protected. However, for purposes of simplicity only the protective device associated with the phase T is illustrated. The elements of protective device of the present invention include an air core transformer 2 having a primary winding 1 in series with the phase T, and a secondary winding 3. Coupled in series with the secondary winding 3 is a superconducting coil 4. Superconducting coil 4, in conventional fashion, is contained within a cryostat or thermal insulating structure 5. It will be cooled in well known manner using liquid or gaseous helium. Surrounding the superconducting coil 4 and its cryostat 5 is an iron shield 6. Preferably the shielding means comprise finely laminated iron having low permeability. Iron shield 6 has associated therewith a magnetizing coil 7 by means of which the iron shield 6 can be transversely magnetized, i.e. can be magnetized in a direction perpendicular to the magnetization which will be caused the transformer windings 1 and 3. The transformer 2 is coupled in a manner equivalent to that of a current transformer. With the secondary windings 3 arranged concentrically to the primary windings 1 close coupling between the primary and secondary windings is achieved. The secondary winding 3 is short circuited by the superconductor 4. The reactance of the superconductor 4 is maintained as low as possible in order that, for network currents below a given limit, the field developed by the secondary winding 3 in opposition to the field produced by the primary winding is such that only a very small stray flux permeates the gap between the primary and secondary windings to cause only a minor voltage drop at the primary winding 1.

The magnetizing coil 7 will be energized by an appropriate DC source. The arrangement of the superconductor 4 relative to air core transformer is such that the stray flux occurring at the nominal network current is not able to saturate the iron shield 6. Thus, the stray flux occurring between the primary winding 1 and the secondary winding 3 will not have any influence on the superconductor 4. By means of the magnetizing coil 7 it is possible to drive the iron shield 6 into saturation with the transversal magnetization. At that point the shield 6 losses its shielding effect and the superconductor 4 is exposed suddenly to the stray magnetic field from the air core transformer. Because of the high magnetic field strength the current carrying capacity of the superconductor 4 drops and the superconductor passes into normally conducting state to provide the necessary current limiting.

Figure 2:
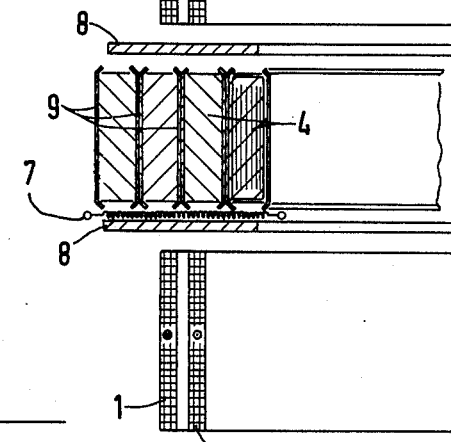
FIG. 2 is an illustration of a second embodiment in which the superconductor is disposed between axially subdivided windings of an air core transformer.
Figure 2A:
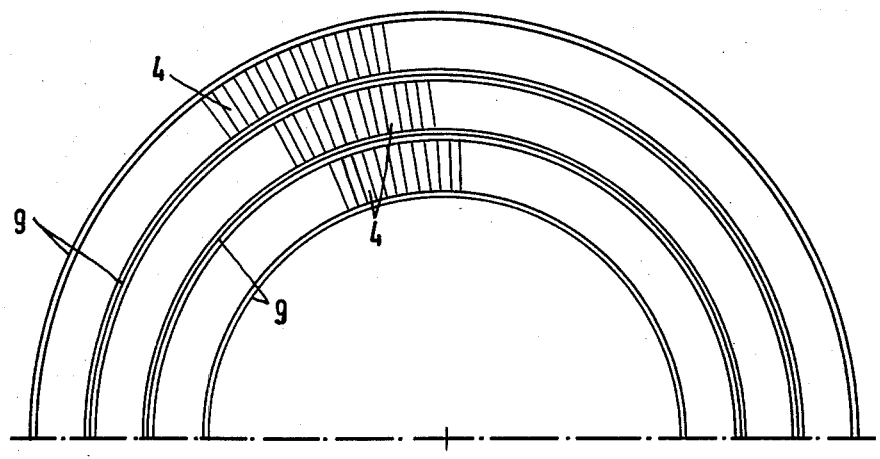
FIG. 2a is a plan view of the superconducting coil arrangement of FIG. 2.

A further embodiment of the invention is illustrated by FIGS. 2 and 2a. Shown is an air core transformer 2 in which the primary winding 1 and secondary winding 3 are axially divided with the superconductor 4 disposed between the two subdivided windings. The superconductor 4 in this and the other embodiments is constructed in accordance with the above mentioned U.S. patent, particularly FIG. 5c thereof. In this embodiment, a closed shield is unnecessary. Instead, magnetically conducting sheets 8 are placed at both end faces thereof. By means of these sheets the stray flux emerging between the primary winding 1 and secondary winding 3 is distributed over the entire width of the superconductor 4. In addition, deflection sheets 9 are placed between the two sheets 8 disposed parallel to the axis of the superconductor. These cause the stray flux to be conducted between the two sheets 8 up to the point of saturation of the deflection sheets 9. The magnetizing coils 7 are associated with deflection sheets 9. On the figure only a single magnetizing coil 7 is shown although there will be a magnetizing coil for each of the deflection sheets 9. In addition, as in the previous embodiment, the superconductor 4 will be contained within a cryostat to maintain it at the proper temperature for superconduction. This is not shown for reasons of simplicity.

In the manner explained above, when the magnetizing coil 7 is energized, the sheets 8 and deflection sheets 9 will become saturated and will no longer shield the superconductor from the stray flux of the transformer 2. Thus, as was the case with FIG. 1 the superconductor 4 will suddenly be exposed to the stray magnetic field of the air core transformer 2 causing its current capacity to drop and superconductor to pass into the normally conducting state.

Figure 3:
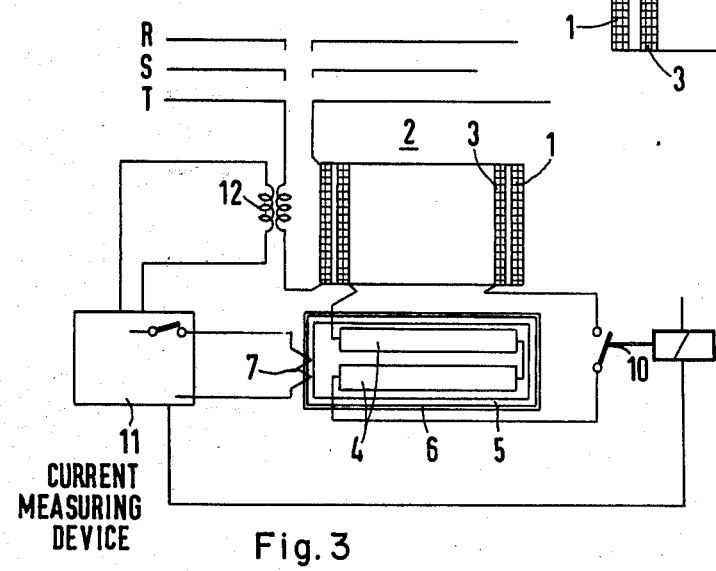
FIG. 3 is a schematic presentation of a superconductor such as that of FIG. 1 in combination with a current measuring device.

FIG. 3 is a block-schematic diagram illustrating a manner in which the current limiting device of the present invention can be operated. In essence, the air core transformer 2, cryostat 5, shield 6 and superconductor 4 are as shown in FIG. 1. In addition to the primary winding 1 which is in series with the phase T the primary winding of a current transformer 12 is also placed in series therewith. The secondary of the current transformer is provided as an input to a current measuring device 11 to be described in more detail in connection with FIG. 4. The current measuring device is preset for a predetermined maximum current and current rate of change. If either the maximum current or current rate of change are exceeded the current measuring device energizes the coil 7 to saturate the shield 5 to cause the superconductor 4 to be subjected to the magnetic field from the transformer 2 causing it to become normally conducting. Also shown on FIG. 3 is a switch 10 for disconnecting the superconductor from the secondary coil 3 upon actuation of the current limiting device. Preferably this switch will be a fast acting circuit breaker which operates in less than two periods of the AC voltage. By so disconnecting the superconductor which is now in a normally conducting state unnecessary losses in the cooling medium are avoided.

Figure 4:
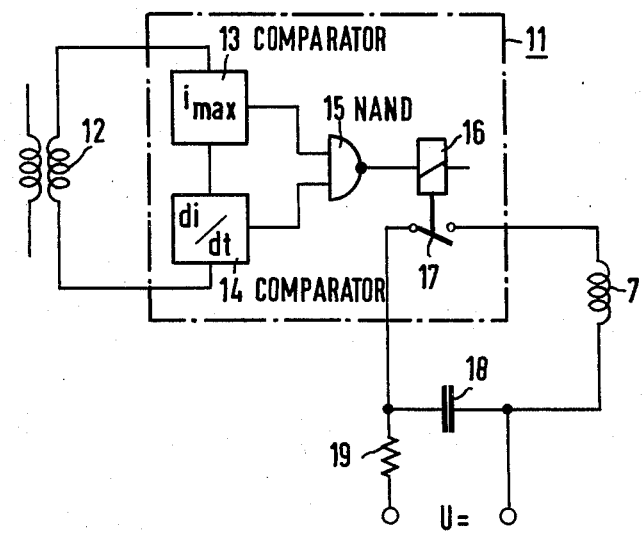
FIG. 4 is a schematic block diagram illustrating the current measuring device of FIG. 3.

FIG. 4 is a schematic-block diagram illustrating the current measuring device 11. The secondary of the transformer is shown connected to two comparators 13 and 14. One of these comparators is set to detect a current exceeding a value $I_{max}$. The second comparator is arranged to detect a rate of change current di/dt exceeding a predetermined value. If either of these values are exceeded an appropriate output occurs. Comparators 13 and 14 will be conventional comparison devices. For example, the AC output of the secondary of the transformer 12 will be rectified and filtered to provide a DC voltage proportional to the current. This DC voltage can be provided directly to comparator having as a reference input a voltage corresponding to the predetermined maximum current $I_{max}$. The second comparator can be coupled through a capacitor to obtain di/dt and will have a reference value corresponding to the maximum desired value of di/dt. The outputs of the two comparators 13 and 14 are provided as inputs to a NAND gate 15. An NAND is a type of gate which will provide a logical zero output when both of its inputs are logical ones and a logical one output at all other times. The comparators 13 and 14 are thus arranged so as to provide logical one outputs when their values are exceeded, these outputs changing to zero if the predetermined value is exceeded. The output of the NAND gate 15 is coupled to a relay 16 having a normally open contact 17 in series with the magnetizing coil 7 and the capacitor 18. When the output of the NAND gate 15 changes from a logical zero to a one in response to one of the comparators 13 or 14 detecting an excessive value of current or current rate of change, the contact 17 is closed coupling the capacitor 18 to the magnetizing coil to energize it and saturate the shield 6 to cause the superconductor 4 to become normally conducting. With reference back to FIG. 3, upon this occurring, the output energizing the relay 16 is also used as an output to energized the fast acting power circuit breaker 10 to open the connection between the secondary coil 3 and the superconductor 4.

The capacitor 18 of FIG. 4 is charged through a resistor 19, the resistor and capacitor being connected in series across an appropriate voltage source designated U. This permits using a small trickle current to charge up the capacitor which then will have a sufficient charge to carry out the necessary magnetization of the shield to cause the superconductor 4 to go into the normally conducting state.

Thus, an improved current limiting device for an electrical network in utilizing a superconductor has been shown. Although specific embodiments have been illustrated and described, it will be obvious to those skilled in the art that various modifications may be made without departing from the spirit of the invention which intended to be limited solely by the appended claims.

I claim:

1. A current limiting device for electrical network comprising:
   a. a superconductor coupled to the network;
   b. a winding through which the network current flows;
   c. magnetically conducting shielding means shielding said superconductor from the magnetic field produced by said winding; and
   d. means for transversely magnetizing said shielding means up to the point of saturation.

2. Apparatus according to claim 1 wherein said winding comprises an air core transformer having a primary winding and a secondary winding, the primary winding of said transformer being coupled in series with the network and having its secondary winding connected in series with said superconductor.

3. Apparatus according to claim 2 and further including a fast acting circuit breaker for disconnecting said secondary winding and said superconductor.

4. Apparatus according to claim 2 wherein the primary and secondary windings of said air core transformer are nested concentrically and wherein said superconductor is arranged coaxially to said primary and secondary windings and wherein said shielding means comprise a closed iron shield surrounding said superconductor.

5. Apparatus according to claim 2 wherein said air core transformer has its primary and secondary windings axially subdivided and wherein said superconductor is arranged between said axially subdivided windings and said shielding means comprise first and second magnetically conducting sheets extending over the width of the superconductor disposed at the two end faces of said superconductor and magnetically conducting deflection sheets disposed between said magnetically conducting sheets and extending parallel to the axis of said superconductor.

6. Apparatus according to claim 1 wherein said shielding means comprise finely laminated iron having a low permeability.

7. Apparatus according to claim 1 and further including means for energizing said means for magnetizing said means comprising at least one capacitor.

8. Apparatus according to claim 7 and further including a current measuring device coupled to said network and providing an output to couple said means for energizing to said means for magnetizing if at least one of the slope of the current and the magnitude exceed a predetermined value.

* * * * *